US012659698B2

(12) United States Patent
Feldman et al.

(10) Patent No.: US 12,659,698 B2
(45) Date of Patent: Jun. 16, 2026

(54) AUTOMATED ELECTRIC VEHICLE SUPPLY EQUIPMENT (EVSE) GROUP COMMISSIONING SYSTEM AND METHOD

(71) Applicants: Siemens Industry, Inc., Alpharetta, GA (US); Siemens Aktiengesellschaft, Munich (DE)

(72) Inventors: Daniel Feldman, New York, NY (US); Nico Fritsch, Forchheim (DE)

(73) Assignees: Siemens Industry, Inc., Alpharetta, GA (US); Siemens Aktiengesellschaft, Munich (DE)

( * ) Notice: Subject to any disclaimer, the term of this patent is extended or adjusted under 35 U.S.C. 154(b) by 316 days.

(21) Appl. No.: 18/335,537

(22) Filed: Jun. 15, 2023

(65) Prior Publication Data

US 2024/0422510 A1      Dec. 19, 2024

(51) Int. Cl.
| | |
|---|---|
| *H04W 4/06* | (2009.01) |
| *H04L 9/40* | (2022.01) |
| *H04L 41/0803* | (2022.01) |
| *H04W 4/46* | (2018.01) |
| *H04W 12/062* | (2021.01) |
| *H04W 76/14* | (2018.01) |

(52) U.S. Cl.
CPC ........... *H04W 4/06* (2013.01); *H04L 41/0803* (2013.01); *H04L 63/08* (2013.01); *H04W 4/46* (2018.02); *H04W 12/062* (2021.01); *H04W 76/14* (2018.02)

(58) Field of Classification Search
CPC ..... H04W 4/46; H04W 4/06; H04W 36/0077; H04W 76/14; H04W 12/062; H04L 41/0803; H04L 41/0806; H04L 41/0886; H04L 41/0893; H04L 67/125; H04L 63/08

USPC .......................................................... 370/328
See application file for complete search history.

(56) References Cited

U.S. PATENT DOCUMENTS

| | | | | |
|---|---|---|---|---|
| 2012/0044843 | A1* | 2/2012 | Levy | H02J 13/00002 370/310 |
| 2014/0180922 | A1* | 6/2014 | Kim | G06Q 20/401 320/109 |
| 2014/0210408 | A1* | 7/2014 | Chang | B60L 53/60 320/109 |
| 2019/0061547 | A1* | 2/2019 | Vargas-Reighley | H04L 67/125 |

(Continued)

FOREIGN PATENT DOCUMENTS

| | | |
|---|---|---|
| EP | 4086109 A1 | 11/2022 |
| EP | 4382350 A2 | 6/2024 |

*Primary Examiner* — Jungwon Chang

(57) ABSTRACT

An automated EVSE group commissioning system comprises a centralized system to supply a series of known valid SSID and password credential combinations to a group of EVSEs. The centralized system to assist in a group pre-connectivity configuration in that if the group of EVSEs is in a same area, they default to connect to each other via a WLAN created by a parent EVSE, to which each child EVSE connects. A first EVSE comprises instructions to commission the first EVSE in the group of EVSEs that is interconnected. Every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to the certain company account.

20 Claims, 3 Drawing Sheets

(56) References Cited

U.S. PATENT DOCUMENTS

| | | | |
|---|---|---|---|
| 2019/0275893 A1* | 9/2019 | Sham ...................... | B60L 58/12 |
| 2020/0376976 A1* | 12/2020 | Ahtikari ................... | H02J 7/00 |
| 2021/0018331 A1* | 1/2021 | Tsuchiya ............... | B60K 35/22 |
| 2021/0195501 A1* | 6/2021 | Bittner ............. | H04W 36/0077 |
| 2022/0144120 A1* | 5/2022 | Feldman ................ | B60L 53/62 |
| 2022/0256327 A1 | 8/2022 | Jang et al. | |
| 2022/0274503 A1* | 9/2022 | Shin ........................ | B60L 53/66 |
| 2023/0169502 A1* | 6/2023 | Ahtikari .............. | G06Q 20/145 |
| | | | 705/44 |
| 2024/0187857 A1* | 6/2024 | Feldman ............ | H04W 12/068 |

* cited by examiner

Figure 4:
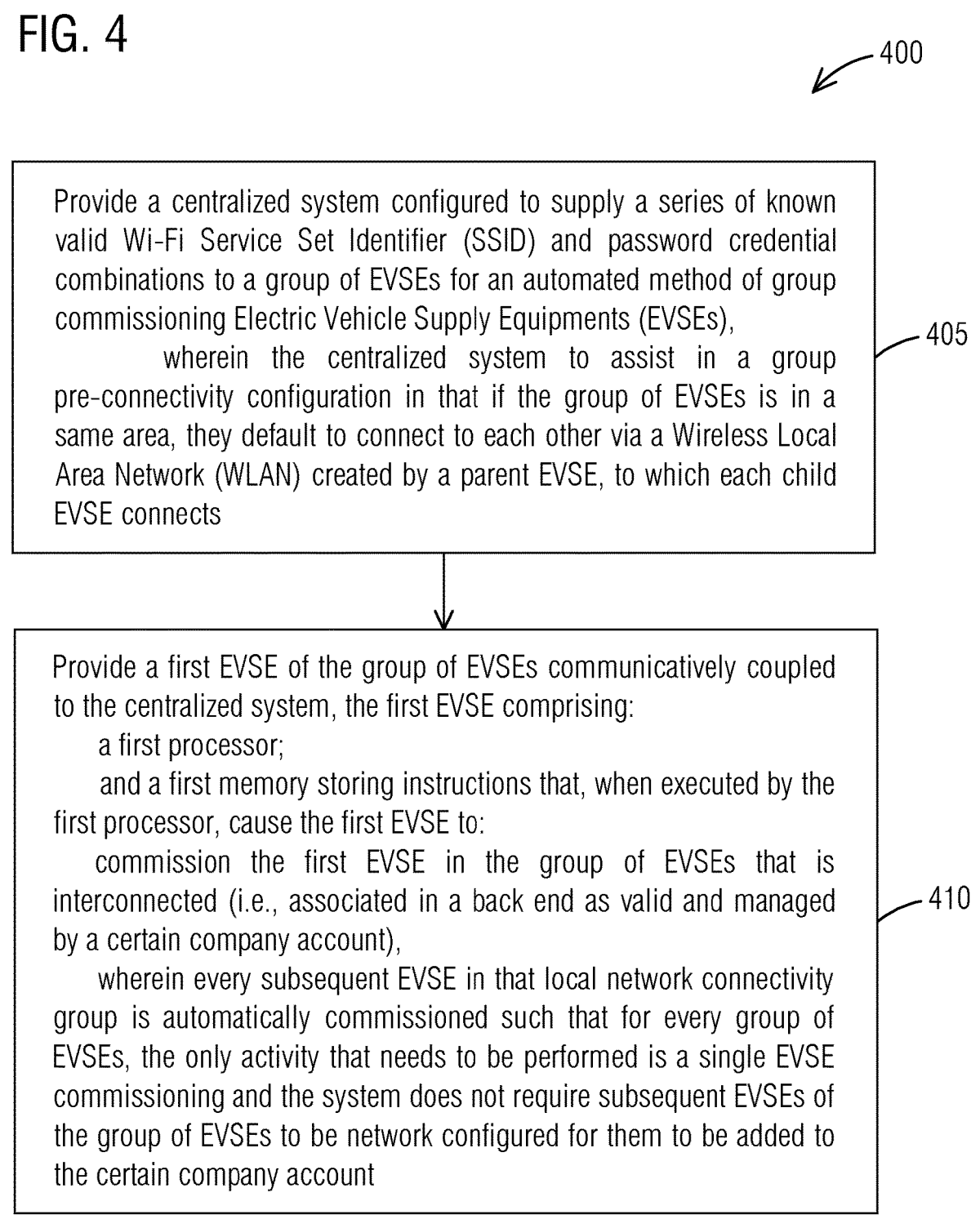

Provide a centralized system configured to supply a series of known valid Wi-Fi Service Set Identifier (SSID) and password credential combinations to a group of EVSEs for an automated method of group commissioning Electric Vehicle Supply Equipments (EVSEs), wherein the centralized system to assist in a group pre-connectivity configuration in that if the group of EVSEs is in a same area, they default to connect to each other via a Wireless Local Area Network (WLAN) created by a parent EVSE, to which each child EVSE connects

405

Provide a first EVSE of the group of EVSEs communicatively coupled to the centralized system, the first EVSE comprising:

a first processor;

and a first memory storing instructions that, when executed by the first processor, cause the first EVSE to:

commission the first EVSE in the group of EVSEs that is interconnected (i.e., associated in a back end as valid and managed by a certain company account), wherein every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to the certain company account

410

AUTOMATED ELECTRIC VEHICLE SUPPLY EQUIPMENT (EVSE) GROUP COMMISSIONING SYSTEM AND METHOD

BACKGROUND

1. Field

Aspects of the present invention generally relate to a system and a method of automated group commissioning of an Electric Vehicle Supply Equipment (EVSE).

2. Description of the Related Art

Unlike gas-powered vehicles, electric vehicles (EVs) do not require internal combustion engines to operate. Outfitted with an electric motor and a rechargeable battery pack, EVs move along our roadways without burning up gasoline, or producing harmful exhaust emissions, while generating less noise pollution. The world of transportation continues to rapidly evolve. Sales of electric vehicles (EVs) are expected to expand rapidly in the US in the coming years. Economics aside, there are growing social and political initiatives toward "clean" energy that will push this to become reality. A number of market forecasts indicate electric vehicles will account for nearly 1 in 5 of all vehicles sold within the next 10 years. It is estimated approximately 3 million EVs will be sold in the US in 2028. A rule of thumb by industry analysts is there need be on the order of 20 public EVC stations per EV on the road to support the ecosystem. There were just over 60,000 charging stations in the US at the end of 2019. Thus, tens of thousands will need to be deployed every year for some time as the market grows.

Charging stations have provided hundreds of millions of charges to EV (electric vehicle) drivers worldwide. When it comes to electric vehicles, the converter is built inside the car. It's called the "onboard charger" though it really is a converter. It converts power from AC to DC and then feeds it into the car's battery. This is the most common charging method for electric vehicles today and most chargers use AC power.

An EV is connected to AC power, 120V or 240V, and a battery charger in the EV converts the AC power to the DC needed to charge the battery and controls the charging process. In DCFC the DCFC converts the AC power to DC and the DC power is sent directly to the EV battery bypassing the onboard battery charger. There are three categories or types of charging: Trickle Charge, AC Charge and DC Charge. Most drivers of electric vehicles (EVs)—which include all-electric vehicles and plug-in hybrid electric vehicles (PHEVs)—charge their vehicles overnight at home using AC Level 1 or AC Level 2 charging equipment.

A charging station, also known as a charge point or electric vehicle supply equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC fast chargers. Batteries can only be charged with direct current (DC) electric power, while most electricity is delivered from the power grid as alternating current (AC). For this reason, most electric vehicles have an onboard charger with an AC-to-DC converter (a rectifier). At an AC charging station, power is supplied to the onboard charger.

EV chargers, when installed, need to be associated to a platform that manages the EV chargers, and within that platform to a certain company that owns the EV charger and is allowed to make configurations to the same EV charger. This process is called commissioning and is normally done EV charger by EV charger as EV chargers are physically installed and turned on. This a tedious and repetitive process when EV chargers are installed as a group in the same location. Prior art includes two options: 1) manual commissioning of each EV charger, individually associated to the platform and to each user account. 2) automated commissioning of EV chargers based on a location. Method 1) is tedious. Method 2) requires configuring each EV charger and uses the location as a proxy for determining EV charger ownership. While that works in certain conditions, it does not work in every situation.

Therefore, there is a need for a system and a method of commissioning EVSEs if location cannot be easily determined due to lack of cellphone cellular coverage, or proximity between chargers that belong to different entities.

SUMMARY

Briefly described, aspects of the present invention relate to a system and a method of automated group commissioning of an Electric Vehicle Supply Equipment (EVSE). The invention consists of a series of steps:

a) Group pre-connectivity configuration:
1. Pre-configure all EV chargers Wi-Fi credentials to a pre-determined Wi-Fi SSID+password default combination, for utilization when the EV charger is used as a child.
2. Pre-configure all EV chargers so that they enter in a network configuration mode whenever they are power cycled, allowing a default network configuration to be modified.
3. Pre-configure all EV chargers so that if they include a natural Wide Area Network interface such as Cellular or if during configuration another interface such as Ethernet is set as their WAN interface, the EV charger is pre-configured to have a WLAN hotspot with the same default Wi-Fi SSID+password combination for when the EV charger is used as a parent.
4. With that, if a group of EV chargers is in the same area, they default to connect to each other via a Wireless LAN network created by the parent, to which each child connects. This means ZERO effort to configure connectivity by default.

b) When the first EV charger in a group of EV chargers that is interconnected is commissioned (i.e., associated in a backend as valid and managed by a certain company), every subsequent EV charger in that local network connectivity group is automatically commissioned. With this, for every group of EV chargers, the only activity that needs to be performed is a single EV charger commissioning. Future EV chargers that are connected to the same EV charger would be automatically associated to the same account. Note: once a charger is associated to a certain account, only the account holder or a user with global rights on the platform is able to change that association.

Note: the same method can be used to identify other EV chargers in the same Ethernet network, even if this Ethernet network is not created by an EV charger. In this variation of the algorithm, the EV chargers would look for other EV chargers in the network in which they are present and then inform the backend of the serial number of the other EV chargers found on the network. The backend would use this information to commission the EV charger and associate it to the relevant account. This would be zero effort commissioning for all new EV chargers in a company network.

In accordance with one illustrative embodiment of the present invention, an automated Electric Vehicle Supply Equipment (EVSE) group commissioning system is provided. The system comprises a centralized system configured to supply a series of known valid Wi-Fi Service Set Identifier (SSID) and password credential combinations to a group of EVSEs. The centralized system to assist in a group pre-connectivity configuration in that if the group of EVSEs is in a same area, they default to connect to each other via a Wireless Local Area Network (WLAN) created by a parent EVSE, to which each child EVSE connects. The system further comprises a first EVSE of the group of EVSEs communicatively coupled to the centralized system. The first EVSE comprises a first processor and a first memory storing instructions that, when executed by the first processor, cause the first EVSE to: commission the first EVSE in the group of EVSEs that is interconnected (i.e., associated in a backend as valid and managed by a certain company account). Every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to the certain company account.

In accordance with one illustrative embodiment of the present invention, an automated method of group commissioning Electric Vehicle Supply Equipments (EVSEs) is provided. The method comprises providing a centralized system configured to supply a series of known valid Wi-Fi Service Set Identifier (SSID) and password credential combinations to a group of EVSEs. The centralized system to assist in a group pre-connectivity configuration in that if the group of EVSEs is in a same area, they default to connect to each other via a Wireless Local Area Network (WLAN) created by a parent EVSE, to which each child EVSE connects. The method further comprises providing a first EVSE of the group of EVSEs communicatively coupled to the centralized system. The first EVSE comprises a first processor and a first memory storing instructions that, when executed by the first processor, cause the first EVSE to: commission the first EVSE in the group of EVSEs that is interconnected (i.e., associated in a backend as valid and managed by a certain company account). Every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to the certain company account.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 illustrates a schematic view of a flow chart of a method for automated Electric Vehicle Supply Equipment (EVSE) group commissioning in accordance with an embodiment of the present invention.

DETAILED DESCRIPTION

Figures 1, 2:
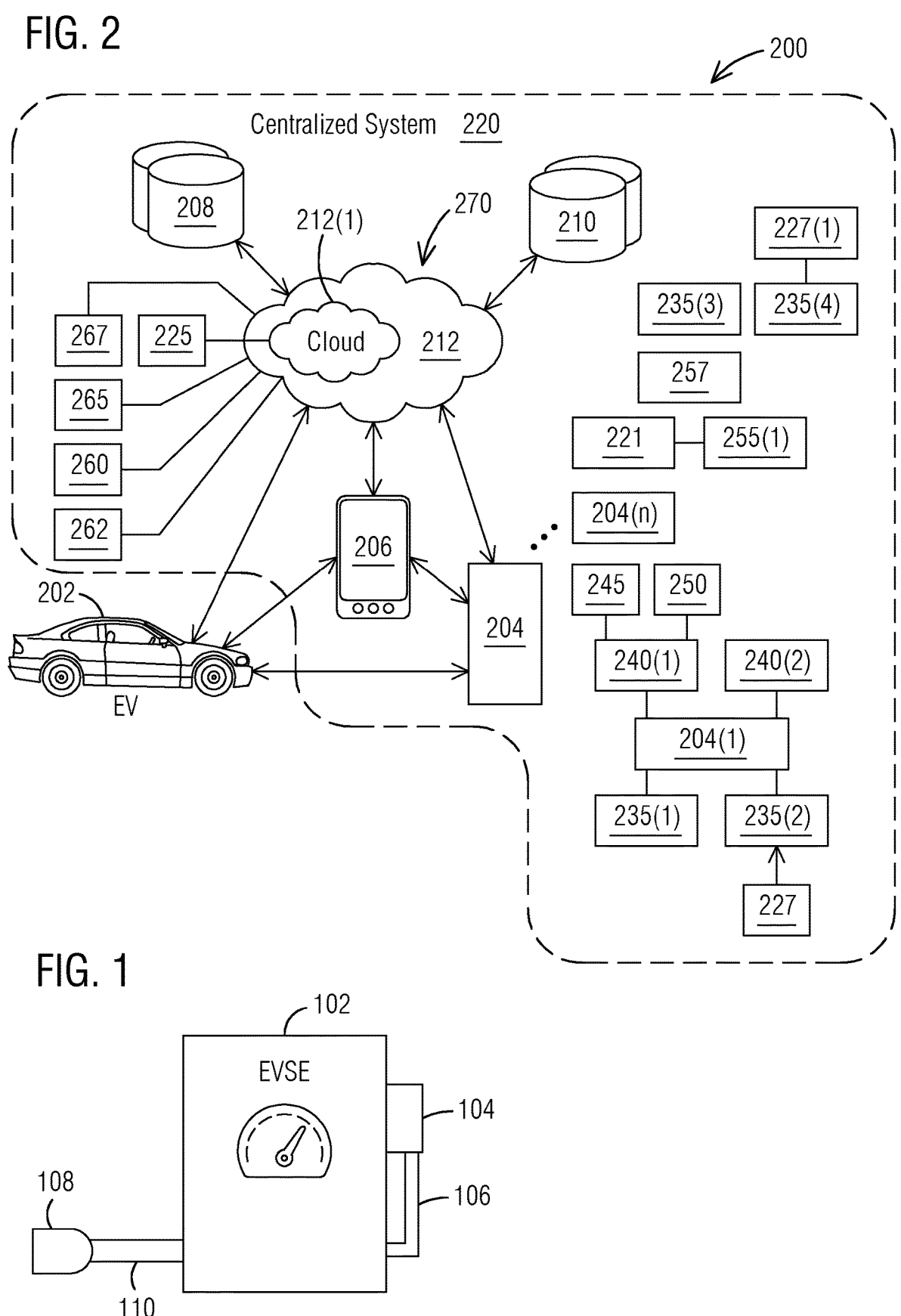
FIG. 1 illustrates a diagram of an EVSE in accordance with an exemplary embodiment of the present invention.
FIG. 2 illustrates an automated Electric Vehicle Supply Equipment (EVSE) group commissioning system in accordance with an exemplary embodiment of the present invention.

Various technologies that pertain to systems and methods that automatically commission a group of EVSEs are provided. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an automated EVSE group commissioning system and a method that can commission a group of EVSEs. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the automated EVSE group commissioning system according to the present disclosure are described below with reference to FIGS. 1-4 herein. Like reference numerals used in the drawings identify similar or identical elements throughout the several views. The drawings are not necessarily drawn to scale.

The term electric vehicle (EV), as used herein, refers to a motorized vehicle deriving locomotive power, either full-time or part-time, from an electric system on board the motorized vehicle. By way of non-limiting examples, an EV may be an electrically powered passenger vehicle for road use; an electric scooter; an electric fork lift; a cargo-carrying vehicle powered, full-time or part-time, by electricity; an off-road electrically powered vehicle; an electrically powered watercraft; etc.

The term electric vehicle supply equipment (EVSE), as used herein, refers to equipment by which an EV may be charged or recharged. An EVSE may comprise or be coupled to a computing system whereby service to the EV is provisioned, optionally, according to parameters. In some embodiments, values for the parameters are operator-selectable. Alternatively, or in addition, the values for the parameters may be automatically selected. An EVSE may comprise a means of providing cost accounting, and may further comprise a payment acceptance component. An EVSE may be installed at a home or residence of an owner/operator of an EV, at a place of business for an owner/operator of an EV, at a fleet facility for a fleet comprising one or more EVs, at a public charging station, etc. The present disclosure uses the terms EVSE and "charging station," where for purposes of this disclosure, an EVSE is an example of a charging station.

An EVSE may be portable such that it can be brought by a user to various locations and used to charge an EV. For example, a user may install and use an EVSE at home to charge an EV. The user may then travel to a friend or family member's home, bringing the EVSE, and install and use the EVSE to charge the EV at the friend or family member's home.

The EVSE can be installed by connecting a plug of the EVSE to an electrical outlet at the installation location. The EVSE may then be used to deliver electricity to an EV for charging. However, electrical conditions may vary based on the installation location, which may impact EVSE performance, and the EVSE may need to be configured at different installation locations. Configuring the EVSE may be time and/or labor intensive, but improper configuring can be detrimental. For example, a maximum current delivered by the EVSE may vary based on the electrical conditions where the EVSE is installed, so the EVSE may need to be configured to determine a correct maximum current. Otherwise, use of the EVSE having an improper configuration may cause an electrical fault, tripping a circuit breaker of the installation location and disrupting charging. Accordingly, embodiments of the present disclosure relate to techniques for determining an EVSE configuration at each location where an EVSE is installed.

Consistent with one embodiment of the present invention, FIG. 1 represents an EVSE 102 in accordance with an exemplary embodiment of the present invention. In the embodiment shown, the EVSE 102 is portable and can be installed at and moved between different locations. In some embodiments, EVSE 102 is not portable and is installed at a fixed location. In the embodiment shown, EVSE 102 includes a nozzle 104 and a cord 106 connecting the nozzle 104 to the body of the EVSE 102. The nozzle 104 is configured for insertion into an EV port delivering electricity to an EV for charging a battery of the EV. In some embodiments, the cord 106 is extendible and/or retractable. In the embodiment shown, EVSE 102 includes a plug 108 configured for connection to an electrical outlet at an installation location and a cord 110 connecting the plug 108 to the body of the EVSE 102. In some embodiments, the cord 110 is extendible and/or retractable.

In some embodiments, the EVSE 102 includes a computing device including one or more processors and one or more storage devices, where the one or more processors are configured to execute software instructions and/or a program stored by the one or more storage devices. For example, the one or more processors may execute software instructions that configure and commission EVSE 102 by setting values for one or more parameters for charging an electrical vehicle. In some embodiments, the values for the one or more parameters are operator selectable. In some embodiments, the values for the one or more parameters are automatically selected by the EVSE. In some embodiments, the values for the one or more parameters include operator selectable values and automatically selected values.

In some embodiments, the one or more parameters may be operational parameters and may include one or more Wi-Fi networks the EVSE may be connected at a particular location (e.g., installation location) or user(s) that are authorized to utilize (e.g., use or charge a vehicle from) the EVSE. In some embodiments, one, a subset, or all of these parameters may be determined by the location where the EVSE is installed and/or agreement(s) between the user and the charging point operator (e.g., the company managing the EVSE) or the electric utility company. When connected to the grid through an appropriate adapter, the EVSE may be able to identify a maximum current allowed on that connection to the grid, for example, based on the input voltage, or on the voltage sensed on the pins of the adapter.

In some embodiments, one or more of these parameters (and corresponding values thereof) may be provided in an EVSE configuration file, where a different configuration file is determined for each different location where EVSE 102 is installed. Accordingly, when a configuration file is used, it may configure the EVSE 102 to operate according to the values for each of the one or more parameters that are included in the configuration file.

In some embodiments, the EVSE 102 is configured with a default configuration file that includes a default value for a Wi-Fi configuration alone, or in addition to values for one or more of the other parameters. In some embodiments, the value of the Wi-Fi configuration is a company Wi-Fi network for the EVSE 102. In some embodiments, if additional configuration file(s) are not downloaded for the EVSE 102 or the Wi-Fi configuration of the EVSE 102 is not otherwise changed, the company Wi-Fi network credentials are used as the default value for the Wi-Fi configuration parameter. In some embodiments, the default value for the Wi-Fi configuration parameter cannot be a valid Wi-Fi configuration when the EVSE 102 is installed at a new location, implying that a user is to then set a new value for the Wi-Fi configuration parameter for the EVSE 102 at each new location (e.g., via an application on the user's computing device or a user interface of the EVSE 102) prior to any current draw by the EVSE 102. In some embodiments, the EVSE 102 is configured to connect to a default Wi-Fi network set by a user.

In whatever case, it is contemplated that a user may set/adjust the value for the Wi-Fi configuration parameter for the location away from the default. For example, the user may use a user interface of the EVSE 102, or a computing device (such as the computing device 206 to be described) to make these changes. These adjustments may be saved or written back to a configuration file for the location (wherever it may be stored, as described herein). These adjustments may be made such that the Wi-Fi configuration of the EVSE 102 at that location is within the applicable electrical communication conditions at that location. For example, if the user is aware that the Wi-Fi Network used by the EVSE 102 at that location is a second company Wi-Fi network, the user may set the value for the Wi-Fi configuration parameter for the location to the second company Wi-Fi network.

In some embodiments, EVSE 102 includes a global positioning system (GPS) circuitry configured to determine a current location of the EVSE 102. In some embodiments, the EVSE 102 includes circuitry configured to determine a current location using triangulation based on two or more wireless communication network access points (e.g., for IEEE 802.11 (referred to herein as "Wi-Fi®") access points, Global System for Mobile Communication (GSM) access points, Long-Term Evolution (LTE) access points, Fifth-Generation (5G) mobile network access points, or the like) for which respective locations are known. In some embodiments, the EVSE 102 includes a communication interface to provide network connectivity using a communication network (e.g., Wi-Fi®, GSM, LTE, 5G, or the like) (e.g., network 212, discussed below) and/or communication via other techniques, such as Bluetooth®. In some embodiments, the EVSE 102 includes circuitry configured to determine a current location of the EVSE 102 using connectivity to a communication network. For example, the EVSE 102 may determine a current location by determining a location of an applicable Wi-Fi® service set identifier (SSID) and/or wireless local area network (WLAN) Access Point (AP), or by identifying the location of a public internet protocol (IP) address, given that public IP addresses associated with different places are different. In another example, the EVSE 102 may determine a current location of the EVSE 102 by implementing connectivity (e.g., via Bluetooth®) with a computing device (e.g., cellular or mobile phone, tablet, etc.) located proximal to the EVSE 102 such that the location of the computing device and EVSE 102 are substantially the same, and receiving location data from the computing device reflecting the current location from the computing device. The computing device may determine its location using included GPS circuitry of the computing device. For example, the EVSE 102 may establish connectivity (e.g., via Bluetooth®) with a proximally positioned mobile phone. The EVSE 102 may then determine a current location of the EVSE 102 by receiving, from the mobile phone, the location of the mobile phone as determined by the GPS circuitry of the mobile phone (e.g., as GPS coordinates), which is understood to also reflect the location of the EVSE 102, as described above. In some embodiments, this process may occur without explicit user input at the EVSE 102 (or even, in some cases, the proximal computing device), such that the EVSE 102 may autonomously identify its location. In some embodiments, the EVSE 102 may, alternatively or additionally, provide information regarding its location (e.g. Wi-Fi® access point media access control (MAC) address, public IP address, etc.) to the computing device 210 and/or database 208 via network 212 (discussed below with reference to FIG. 2), which can use that information to determine the location of the EVSE 102.

In some embodiments, one or more configuration files of the EVSE 102 are stored by the EVSE 102 (e.g., in local storage). In some embodiments, the one or more configuration files are alternatively or additionally stored in network (e.g. "cloud") storage (e.g., database 208 and/or computing device 210 of FIG. 2, discussed below), and the EVSE 102 downloads a configuration file for a particular location when it is determined that the EVSE 102 is installed at that location. For example, the EVSE 102 may determine its current location (e.g., a location where it is currently installed) and download a configuration file that corresponds to the current location. In another example, the EVSE 102 may determine its current location and use the current location to obtain a configuration file corresponding to that location from local storage. In some embodiments, the configuration file specifies the maximum current available for delivery by the EVSE 102 at that location. In some embodiments, the EVSE 102 determines that it is installed at a particular location and automatically configures itself with the EVSE configuration file associated with that location. In some embodiments, a configuration file is manually selected by a user of the EVSE 102, for example, via a user interface (not shown) of the EVSE 102. In some embodiments, a configuration file for the EVSE 102 is manually selected, for example, via a computing device (e.g., cellular or mobile phone, tablet, etc.) connected to the EVSE 102 (e.g., via Bluetooth®, Wi-Fi®, cable, etc.). In some embodiments, a configuration file is manually selected, for example, via a computing device (e.g., cellular or mobile phone, tablet, etc.) connected to the EVSE 102 via a cellular network or wide area network (e.g., the Internet) and/or via a mobile application of the computing device.

In some embodiments, the configuration file may be shared by a network, such that a plurality of portable EVSE 102 can access the configuration file. Stated otherwise, the configuration file may be associated with the location and stored in a distributed or otherwise accessible platform (e.g., a cloud computing environment) where multiple portable EVSE 102 can access the information in the configuration file. In some embodiments, the location (e.g., physical properties of the location) may be altered, such that a configuration of the location changes. For example, a 240 volt outlet may be installed to be used for EV charging instead of a 120 volt outlet. Or the wiring of a location may be updated or enhanced. In some embodiments, the location configuration file may be updated or otherwise altered to store the new information. In other embodiments, a new location configuration file may be prepared and stored. The new configuration file may be stored in place of the original configuration file, or the original configuration file may simply be deleted or otherwise discarded.

Referring to FIG. 2, it illustrates an automated EVSE group commissioning system 200 in accordance with an exemplary embodiment of the present invention. In some embodiments, the automated EVSE group commissioning system 200 includes a vehicle 202 and a charging station 204. For example, the vehicle 202 may be an EV discussed above and/or the charging station 204 may be an EVSE discussed above (e.g., EVSE 102). In some embodiments, the charging station 204 may be portable and installed in various different locations. The vehicle 202 may be charged using the charging station 204, where electricity may be provided from the charging station 204 to a battery of the vehicle 202.

In some embodiments, the automated EVSE group commissioning system 200 includes a computing device 206. For example, the computing device 206 may be a cellular phone, tablet computer, laptop computer, or the like. In some embodiments, the computing device 206 includes GPS circuitry configured to determine a current location of the computing device 206. In some embodiments, the computing device 206 includes circuitry configured to determine a current location of the computing device using triangulation based on two or more wireless communication network access points for which respective locations are known. For example, one, some, or each of the two or more wireless communication network access points may be a Wi-Fi® access point. In another example, one, some, or each of the two or more wireless communication network access points may be a node of a mobile communication network (e.g., a cellular network such as GSM, LTE, 5G, or the like). In some embodiments, the computing device 206 is used to access one or more configuration files (e.g., stored internally in memory of the computing device 206 and/or at a remote location such as one or more databases 208) for configuring the charging station 204. For example, a user may select a configuration file for the charging station 204 using a software application accessed by the computing device 206.

In some embodiments, the computing device 206 is a computing device of a driver, occupant, or individual otherwise associated with the vehicle 202. In some embodiments, the computing device 206 is in wireless or wired communication with the vehicle 202. For example, the vehicle 202 may include short range communication (e.g., Bluetooth®) functionality where, for example, an onboard computing device of the vehicle 202 may transmit data to and/or receive data from one or more of the computing devices 206 (e.g., via Bluetooth®) located within a communication range of the vehicle 202. In some embodiments, the computing device 206 is in wireless or wired communication with the charging station 204. For example, the charging station 204 and/or the computing device 206 may also include short range communication (e.g., Bluetooth®) functionality and may transmit data to and/or receive data from each other and/or other computing devices located within a communication range of the charging station 204 and/or the computing device 206, respectively. The vehicle 202, charging station 204, and computing device 206 may further each use a network 212 for communication with each other, as discussed below.

In some embodiments, the system 200 includes one or more databases 208. For example, a database 208 may store data from or used by one or more of the vehicle 202, the charging station 204, the computing device 206, and/or the computing device 210 (discussed below). In some embodiments, the one or more databases 208 stores one or more configuration files for the charging station 204.

In some embodiments, the automated EVSE group commissioning system 200 includes one or more other computing devices 210. For example, a computing device 210 may be a remote computing device (e.g., a cloud computer or the like) that communicates with one or more of the vehicle 202, the charging station 204, the computing device 206, and/or the database 208 directly or via the network 212. In some embodiments, the computing device 210 determines whether a particular user (e.g., vehicle driver, occupant, or person associated with the vehicle) is authorized to charge or have vehicle 202 charged at a particular charging station 204. For example, the computing device 210 may process data (e.g., identification data, security token data, etc.) from the vehicle 202, the charging station 204, the computing device 206, and/or the database 208 to determine whether a user is authorized to charge or have the vehicle 202 charged by the charging station 204. In some embodiments, the computing device 210 is configured to control charging of the vehicle 202 and/or determine an estimated state of charge (SoC) of the vehicle 202. For example, the computing device 210 may receive one or more of location data, SoC data, vehicle characteristics, and the like from the vehicle 202, the charging station 204, the computing device 206, and/or the database 208 and make a determination whether the vehicle is authorized to or otherwise can be charged by the charging station 204 at the present location.

In some embodiments, the automated EVSE group commissioning system 200 includes the network 212. For example, the network 212 may be a cellular network, the Internet, a wide area network (WAN), a local area network (LAN), or any other type of communications network (and including any combination of these). In some embodiments, one or more of the vehicle 202, the charging station 204, the computing device 206, the database 208, and/or the computing device 210 use the network 212 to communicate with each other and/or other computing devices. In some embodiments, each of the devices/elements of the automated EVSE group commissioning system 200 includes a network interface that allows for communication within the automated EVSE group commissioning system 200 via the network 212.

In some embodiments, the computing device 206 communicates with the vehicle 202 and/or the charging station 204 directly (e.g., via Bluetooth® or a different short range communication protocol) or indirectly via the network 212. In some embodiments, in addition or alternatively, the vehicle 202 and the charging station 204 communicate with each other directly (e.g., via Bluetooth® or a different short range communication protocol) or indirectly via the network 212.

In some embodiments, the charging station 204 is implemented as EVSE 102. When the EVSE 102 is installed at a location, the EVSE 102 determines the location where it is installed and further determines a configuration file for that location. As discussed above, the location may be determined by EVSE 102 using its own GPS circuitry and/or other internal methods and/or by obtaining location information from a computing device located within a predetermined distance (e.g., 1 foot, 2 feet, 5 feet, 10 feet, etc.) of the EVSE 102 (e.g., via Bluetooth®). The configuration file may specify a Wi-Fi configuration of the EVSE 102, for example, at the location where EVSE 102 is installed, and/or values for one or more other parameters as discussed herein. In some embodiments, the configuration file is stored on the EVSE 102. In some embodiments, the configuration file is obtained by the EVSE 102 from the one or more databases 208.

In some embodiments, the automated EVSE group commissioning system 200 is used to control charging of the vehicle 202 and/or estimate an SoC for the vehicle 202. For example, the charging control and/or SoC estimation may be performed by the computing device 206 and/or the computing device 210.

In some embodiments, the computing device 206 may store a software application that facilitates configuring and/or manually setting values for one or more parameters of the charging station 204, estimating the SoC for the vehicle 202, and/or controlling charging of the vehicle 202.

The automated EVSE group commissioning system 200 comprises a centralized system 220 configured to supply a series of known valid Wi-Fi Service Set Identifier (SSID) and password credential combinations 225 to a group of EVSEs 204(1-n). A service set identifier (SSID) is a unique identifier that allows devices to connect to a Wi-Fi network. The SSID differentiates between multiple Wi-Fi networks in an area so users can connect to the right one. The centralized system 220 to assist in a group pre-connectivity configuration in that if the group of EVSEs 204(1-n) is in a same area, they default to connect to each other via a Wireless Local Area Network (WLAN) 221 created by a parent EVSE 255(1), to which each child EVSE 257 connects.

The automated EVSE group commissioning system 200 further comprises a first EVSE 204(1) of the group of EVSEs 204(1-n) communicatively coupled to the centralized system 220. The first EVSE 204(1) comprises a first processor 235(1) and a first memory 235(2) storing instructions 227 that, when executed by the first processor 235(1), cause the first EVSE 204(1) to: commission the first EVSE 204(1) in the group of EVSEs 204(1-n) that is interconnected (i.e., associated in a backend 260 as valid and managed by a certain company account 240(1)). Every subsequent EVSE in that local network connectivity group is automatically commissioned such that for every group of chargers, the only activity that needs to be performed is a single charger commissioning and the system 220 does not require subsequent EVSEs of the group of EVSEs 204(1-*n*) to be network configured for them to be added to the certain company account 240(1).

A charging station backend is a software that enables billing, management, monitoring and maintenance of e-charging stations. A user can create a company account for an eMobility platform (e.g., a cloud computing environment). Multiple users may be added to your company account. If one owns or operates a charging station for use commercially (a "Charging Station Operator"), the Charging Station Operator may be affiliated or associated to a company account.

The centralized system 220 further comprises a cloud 212(1) that is configured to manage the configuration of the first EVSE 204(1) so once the first EVSE 204(1) is network connected it can receive a pre-known valid Wi-Fi SSID and password credential combination 225 from the cloud 212(1). The cloud 212(1) ensures that the pre-known valid Wi-Fi SSID and password credential combinations 225 are distributed to the group of EVSEs 204(1-*n*) in the entire charger population controlled by an administrator configuring these charger settings.

The centralized system 220 further comprises a hand-held computing device 206 such as a cellular phone that can be used to configure multiple EVSEs where the pre-known valid Wi-Fi SSID and password credential combination 225 may be stored. It could also happen that the cellular phone grabs Wi-Fi configuration information from the cloud 212(1) and when configuring a EVSE the Wi-Fi configuration information is preloaded by identifying a charger serial number to a list of EVSEs that belong to the company 240(1). A location of the cellular phone could be used to infer a charger location, so no need to enter that manually.

When configuring the first EVSE 204(1) there could be one or more Wi-Fi SSID and password credential combinations 225 that are valid for that company 240(1) which a certain company can load.

A profile 245 of the first EVSE 204(1) and user rights 250 to the certain company account 240(1) are associated to the certain company account 240(1) or associated by the act of commissioning such that once a user associates the first EVSE 204(1) to the certain company account 240(1) who has preconfigured credentials that apply to that location 240(2) or different locations then the preconfigured credentials are automatically stored in the first EVSE 204(1).

The automated EVSE group commissioning system 200 further comprises a first parent EVSE 255(1) and a child EVSE 257 wherein the first parent EVSE 255(1) has an LTE modem and a hot spot such that the child EVSE 257 is connected to the first parent EVSE 255(1) who can support multiple child EVSEs.

The centralized system 220 further comprises a second processor 235(3) and a second memory 235(4) storing instructions 227(1) that, when executed by the second processor 235(3), cause the centralized system 220 to: pre-configure all EVSEs Wi-Fi credentials to a pre-determined Wi-Fi SSID+password default combination 225, for utilization when an EVSE is used as a child. The centralized system 220 to: pre-configure all the EVSEs so that they enter in a network configuration mode 262 whenever they are power cycled, allowing a default network configuration to be modified. The centralized system 220 to: pre-configure all the EVSEs so that if they include a natural Wide Area Network (WAN) interface 265 such as Cellular or if during configuration another interface such as Ethernet 267 is set as their WAN interface, the first EVSE 204(1) is pre-configured to have a WLAN hotspot with the same default Wi-Fi SSID+password combination 225 for when the EVSE is used as a parent.

In the automated EVSE group commissioning system 200, if the group of EVSEs 204(1-*n*) is in the same area, all EVSEs default to connect to each other via the WLAN created by the parent EVSE, to which each child EVSE connects needing a ZERO effort to configure connectivity by default thus providing ZERO-effort commissioning for standard commercial chargers.

The centralized system 220 and the first EVSE 204(1) need a ZERO effort to configure connectivity by default thus providing ZERO-effort commissioning for standard commercial chargers. The EVSEs that are connected to a same EVSE would be automatically associated to the same certain company account 240(1). Once an EVSE is associated to a certain account, only an account holder or a user with global rights on a platform 270 (e.g., a cloud computing environment) is able to change that association.

In one embodiment, wherein an EVSE to identify other EVSEs in a same Ethernet 267 network, even if the Ethernet 267 network is not created by the EVSE and then inform the backend 260 of a serial number of other EVSEs found on the Ethernet 267 network. The backend 260 would use this information to commission the EVSE and associate it to a relevant company account such that there would be zero effort commissioning for all new EVSEs in a company network. The commissioning comprises EVSEs when installed, associated to a platform (e.g., a cloud computing environment) that manages the EVSEs, and within that platform to a certain company that owns the EVSE and is allowed to make configurations to the same EVSE.

Figure 3:
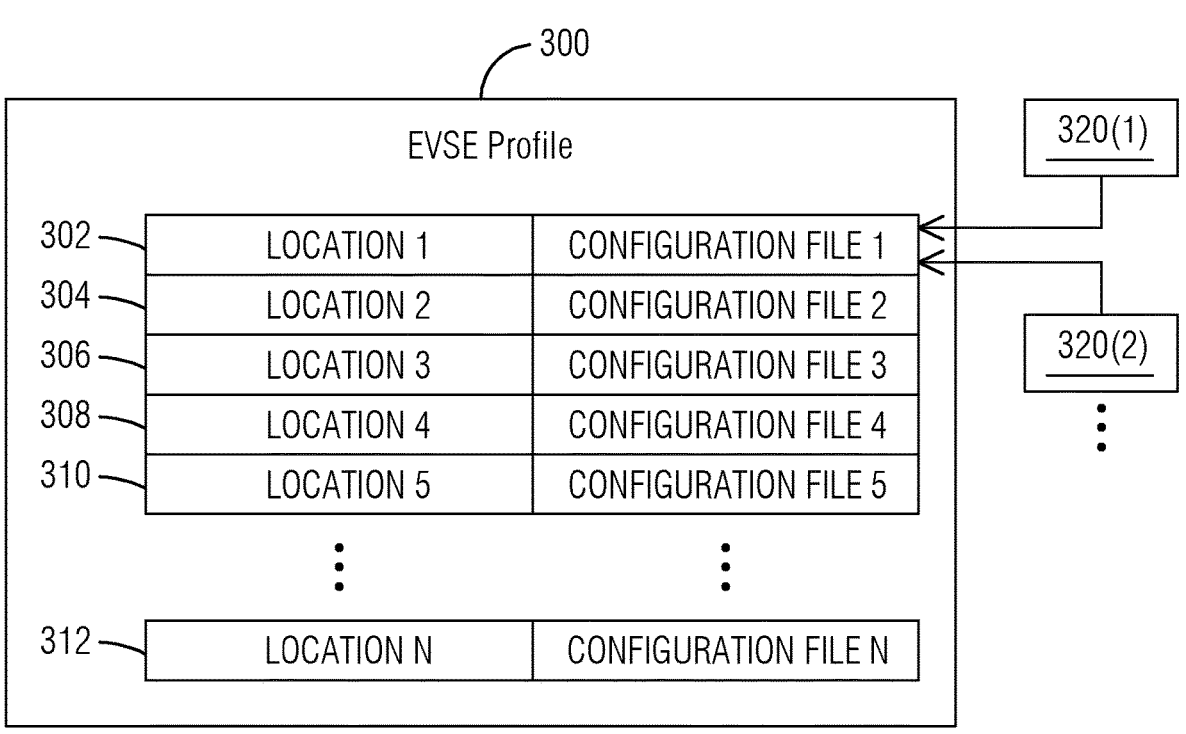
FIG. 3 illustrates an EVSE profile for a user and/or account holder associated with an EVSE in accordance with an embodiment of the present invention.

Turning now to FIG. 3, it illustrates an EVSE profile 300 for a user and/or account holder associated with an EVSE in accordance with an embodiment of the present invention. As shown, the profile 300 includes configuration files 302 through 312 (configuration files 1 through N) that correspond to various locations 1 through N. In some embodiments, the geolocation (e.g., GPS coordinates) and/or address and/or Wi-Fi® SSID, WLAN AP, and/or MAC address associated with a location is stored in a configuration file. For example, in configuration file 1 a known valid Wi-Fi® Service Set Identifier (SSID) and password credential combination 320(1) and a Wireless Local Area Network (WLAN) 320(2) created by the parent EVSE 255(1) of the EVSE are stored.

In some embodiments, each configuration file is visible to a user and/or account holder via a dashboard or user interface (e.g., software application), accessed by a computing device, that displays the profile 300. Copies of the profile 300 may be stored on an EVSE itself (e.g., included in the charging station 204), and/or on a database (e.g., the database 208) or a network-accessible computing device (e.g., the computing device 210) such that it is obtainable at/modifiable by the EVSE and/or a computing device of a user (e.g., the computing device 206) over a network (e.g., the network 212), in the manner that has been described above.

Configuring of an EVSE (e.g., EVSE 102) that has been installed at a location for charging an EV is done in accordance with some embodiments. A current location of the EVSE is determined. In some embodiments, the EVSE determines the current location using internal GPS circuitry. In some embodiments, the EVSE determines the current location by using internal circuitry configured to determine a current location using triangulation based on two or more wireless communication network access points (e.g., for Wi-Fi®, GSM, LTE, 5G, or the like) for which respective locations are known.

In some embodiments, the EVSE includes circuitry configured to determine a current location of the EVSE using connectivity to a communication network. For example, the EVSE 102 may determine a current location by determining a location of an applicable Wi-Fi® SSID and/or WLAN AP. In some embodiments, the EVSE determines the current location by implementing connectivity (e.g., via Bluetooth®) with a computing device (e.g., cellular or mobile phone, tablet, etc.) located proximal to the EVSE 102 such that the location of the computing device and EVSE 102 are substantially the same, and receives location data reflecting the current location from the computing device. In some embodiments, the computing device determines the location data using GPS circuitry of the device.

Then, the EVSE obtains a configuration file for configuring the EVSE for delivering electricity to an EV, wherein the configuration file corresponds to the determined current location. In some embodiments, the current location is compared to one or more locations associated with one or more configuration files, and when a match between locations occurs (e.g., an exact match or a match where the compared locations are within a predefined range of each other), the configuration file associated with the matched location is obtained. In some embodiments, the EVSE comprises one or more memory storing the configuration file, and the EVSE obtains the configuration file from the one or more memory. In some embodiments, the configuration file is stored in remote storage (e.g., one or more databases 208), and the EVSE obtains the configuration file from the remote storage (e.g., via network 212, via Bluetooth® connection, or otherwise). In some embodiments, the configuration file is stored within a profile of the user and/or account holder associated with the EVSE, alone or along with one or more other configuration files corresponding to other locations. In some embodiments, the configuration file includes one or more parameters for charging an EV. In some embodiments, the one or more parameters include a maximum current for delivery by the EVSE at the current location (e.g., installation location).

Thereafter, the EVSE is configured for delivering electricity to an EV according to the configuration file. The system 200 manages the configuration from the cloud so once a charger is network connected it can receive multiple pre-known Wi-Fi SSID/password combinations from the cloud. The system 200 ensures that the Wi-Fi configuration process is controlled and the Wi-Fi configuration is distributed to only a subset of the chargers in the entire charger population being controlled by an administrator configuring these settings. In addition to this "cloud" a phone could be used to configure multiple chargers where these valid Wi-Fi SSID/password combinations are stored. And it could also happen that the phone grabs information from the cloud and when configuring a charger the information is preloaded by identifying the charger serial number to a list of chargers that belong to a company/location. And in addition to this the location of the phone could be used to infer the charger location, so no need to enter that manually.

In this manner, the configured EVSE delivers electricity to an EV in accordance with the values of one or more parameters of the configuration file. In some embodiments, the EV is charged by the delivered electricity.

FIG. 4 illustrates a schematic view of a flow chart of a method 400 for automated Electric Vehicle Supply Equipment (EVSE) group commissioning in accordance with an embodiment of the present invention. Reference is made to the elements and features described in FIGS. 1-3. It should be appreciated that some steps are not required to be performed in any particular order, and that some steps are optional.

The method 400 of automated Electric Vehicle Supply Equipment (EVSE) group commissioning comprises a step 405 of providing a centralized system configured to supply a series of known valid Wi-Fi Service Set Identifier (SSID) and password credential combinations to a group of EVSEs. The centralized system to assist in a group pre-connectivity configuration in that if the group of EVSEs is in a same area, they default to connect to each other via a Wireless Local Area Network (WLAN) created by a parent EVSE, to which each child EVSE connects. The method 400 further comprises a step 410 of providing a first EVSE of the group of EVSEs communicatively coupled to the centralized system. The first EVSE comprises a first processor, and a first memory storing instructions that, when executed by the first processor, cause the first EVSE to: commission the first EVSE in the group of EVSEs that is interconnected (i.e., associated in a backend as valid and managed by a certain company account). Every subsequent EVSE in that local network connectivity group is automatically commissioned such that for every group of chargers, the only activity that needs to be performed is a single charger commissioning and the system does not require subsequent EVSEs of the group of EVSEs to be network configured for them to be added to the certain company account.

While a design based on a Wi-Fi SSID and password credential combination is described here a range of one or more other wireless network credential combinations are also contemplated by the present invention. For example, other wireless network credential combinations such as Zigbee may be implemented based on one or more features presented above without deviating from the spirit of the present invention.

The techniques described herein can be particularly useful for group commissioning via a Wireless Local Area Network (WLAN). While particular embodiments are described in terms of these parameters, the techniques described herein are not limited to such set of parameters but can also be used with other parameters.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An automated Electric Vehicle Supply Equipment (EVSE) group commissioning system, the system comprising:

a centralized system configured to supply a series of known valid Wireless Network Unique Identifier and password credential combinations to a group of EVSEs, the centralized system configured to pre-configure all EVSEs with identical Wi-Fi SSID and password combinations such that when the first EVSE creates a parent wireless network, all subsequent child EVSEs automatically connect using the pre-configured credentials without requiring individual commissioning steps, wherein the centralized system to assist in a group pre-connectivity configuration in that if the group of EVSEs is in a same area, they default to connect to each other via a Wireless Network created by a parent EVSE, to which each child EVSE connects; and a first EVSE of the group of EVSEs communicatively coupled to the centralized system, the first EVSE comprising: a first processor; and a first memory storing instructions that, when executed by the first processor, cause the first EVSE to:

commission the first EVSE in the group of EVSEs that is interconnected, wherein every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to a certain company account.

2. The automated EVSE group commissioning system of claim 1, wherein the centralized system further comprising:

a second processor; and a second memory storing instructions that, when executed by the second processor, cause the centralized system to:

pre-configure all EVSEs Wi-Fi credentials to a pre-determined Wi-Fi SSID+password default combination, for utilization when an EVSE is used as a child.

3. The automated EVSE group commissioning system of claim 2, wherein the centralized system to:

pre-configure all the EVSEs so that they enter in a network configuration mode whenever they are power cycled, allowing a default network configuration to be modified.

4. The automated EVSE group commissioning system of claim 3, wherein the centralized system to:

pre-configure all the EVSEs so that if they include a natural Wide Area Network (WAN) interface such as Cellular or if during configuration another interface such as Ethernet is set as their WAN interface, the EVSE is pre-configured to have a WLAN hotspot with the same default Wi-Fi SSID+password combination for when the EVSE is used as a parent.

5. The automated EVSE group commissioning system of claim 4, wherein if the group of EVSEs is in the same area, all EVSEs default to connect to each other via the WLAN created by the parent EVSE, to which each child EVSE connects needing a ZERO effort to configure connectivity by default thus providing ZERO-effort commissioning for standard commercial chargers.

6. The automated EVSE group commissioning system of claim 1, wherein the centralized system and the first EVSE need a ZERO effort to configure connectivity by default thus providing ZERO-effort commissioning for standard commercial chargers.

7. The automated EVSE group commissioning system of claim 1, wherein EVSEs that are connected to a same EVSE would be automatically associated to the same certain company account.

8. The automated EVSE group commissioning system of claim 7, wherein once an EVSE is associated to a certain account, only an account holder or a user with global rights on a platform is able to change that association.

9. The automated EVSE group commissioning system of claim 1, wherein an EVSE to identify other EVSEs in a same Ethernet network, even if the Ethernet network is not created by the EVSE and then inform the backend of a serial number of other EVSEs found on the Ethernet network, wherein the backend would use this information to commission the EVSE and associate it to a relevant company account such that there would be zero effort commissioning for all new EVSEs in a company network.

10. The automated EVSE group commissioning system of claim 1, wherein commissioning comprising EVSEs when installed, associated to a platform that manages the EVSEs, and within that platform to a certain company that owns the EVSE and is allowed to make configurations to the same EVSE.

11. An automated method of group commissioning Electric Vehicle Supply Equipments (EVSEs), the method comprising:

providing a centralized system configured to supply a series of known valid Wi-Fi Service Set Identifier (SSID) and password credential combinations to a group of EVSEs, the centralized system configured to pre-configure all EVSEs with identical Wi-Fi SSID and password combinations such that when the first EVSE creates a parent wireless network, all subsequent child EVSEs automatically connect using the pre-configured credentials without requiring individual commissioning steps, wherein the centralized system to assist in a group pre-connectivity configuration in that if the group of EVSEs is in a same area, they default to connect to each other via a Wireless Local Area Network (WLAN) created by a parent EVSE, to which each child EVSE connects; and providing a first EVSE of the group of EVSEs communicatively coupled to the centralized system, the first EVSE comprising: a first processor; and a first memory storing instructions that, when executed by the first processor, cause the first EVSE to:

commission the first EVSE in the group of EVSEs that is interconnected, wherein every subsequent EVSE in that local network connectivity group is automatically commissioned such that for every group of EVSEs, the only activity that needs to be performed is a single EVSE commissioning and the system does not require subsequent EVSEs of the group of EVSEs to be network configured for them to be added to the certain company account.

12. The method of claim 11, wherein the centralized system further comprising:

providing a second processor; and a second memory storing instructions that, when executed by the second processor, cause the centralized system to:

pre-configure all EVSEs Wi-Fi credentials to a pre-determined Wi-Fi SSID+password default combination, for utilization when an EVSE is used as a child.

13. The method of claim 12, wherein the centralized system to:

pre-configure all the EVSEs so that they enter in a network configuration mode whenever they are power cycled, allowing a default network configuration to be modified.

14. The method of claim 13, wherein the centralized system to:

pre-configure all the EVSEs so that if they include a natural Wide Area Network (WAN) interface such as Cellular or if during configuration another interface such as Ethernet is set as their WAN interface, the EVSE is pre-configured to have a WLAN hotspot with the same default Wi-Fi SSID+password combination for when the EVSE is used as a parent.

15. The method of claim 14, wherein if the group of EVSEs is in the same area, all EVSEs default to connect to each other via the WLAN created by the parent EVSE, to which each child EVSE connects needing a ZERO effort to configure connectivity by default thus providing ZERO-effort commissioning for standard commercial chargers.

16. The method of claim 11, wherein the centralized system and the first EVSE need a ZERO effort to configure connectivity by default thus providing ZERO-effort commissioning for standard commercial chargers.

17. The method of claim 11, wherein EVSEs that are connected to a same EVSE would be automatically associated to the same certain company account.

18. The method of claim 17, wherein once a EVSE is associated to a certain account, only an account holder or a user with global rights on a platform is able to change that association.

19. The method of claim 11, wherein an EVSE to identify other EVSEs in a same Ethernet network, even if the Ethernet network is not created by the EVSE and then inform the backend of a serial number of other EVSEs found on the Ethernet network, wherein the backend would use this information to commission the EVSE and associate it to a relevant company account such that there would be zero effort commissioning for all new EVSEs in a company network.

20. The method of claim 11, wherein commissioning comprising EVSEs when installed, associated to a platform that manages the EVSEs, and within that platform to a certain company that owns the EVSE and is allowed to make configurations to the same EVSE.

\* \* \* \* \*